(12) United States Patent
Ghannam et al.

(10) Patent No.: US 11,351,961 B2
(45) Date of Patent: Jun. 7, 2022

(54) PROXIMITY-BASED VEHICLE SECURITY SYSTEMS AND METHODS

(71) Applicant: Ford Global Technologies, LLC, Dearborn, MI (US)

(72) Inventors: Mahmoud Yousef Ghannam, Canton, MI (US); Brian Bennie, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 225 days.

(21) Appl. No.: 16/776,312

(22) Filed: Jan. 29, 2020

(65) Prior Publication Data

US 2021/0229629 A1 Jul. 29, 2021

(51) Int. Cl.

| | |
|---|---|
| *B60L 1/00* | (2006.01) |
| *B60R 25/20* | (2013.01) |
| *B60R 25/30* | (2013.01) |
| *B60R 25/31* | (2013.01) |
| *B60R 25/10* | (2013.01) |
| *B60N 2/00* | (2006.01) |

(Continued)

(52) U.S. Cl.
CPC ............... *B60R 25/20* (2013.01); *B60N 2/002* (2013.01); *B60R 11/0229* (2013.01); *B60R 25/01* (2013.01); *B60R 25/102* (2013.01); *B60R 25/1004* (2013.01); *B60R 25/305* (2013.01); *B60R 25/31* (2013.01); *B60R 25/33* (2013.01); *B60R 2011/004* (2013.01)

(58) Field of Classification Search
CPC ..... B60R 25/20; B60R 11/0229; B60R 25/01; B60R 25/1004; B60R 25/102; B60R 25/305; B60R 25/31; B60R 25/33; B60R 2011/004; B60N 2/002

See application file for complete search history.

(56) References Cited

U.S. PATENT DOCUMENTS 3,697,986 A * 10/1972 Colby ................... G01S 13/937
342/182
4,562,439 A * 12/1985 Peralta ..................... G01S 13/89
342/25 D (Continued)

FOREIGN PATENT DOCUMENTS

| DE | 102013021588 A1 * | 7/2014 | ............ G04G 13/02 |
|---|---|---|---|
| DE | 102013021588 A1 | 7/2014 | |
| DE | 102008038022 B4 | 5/2018 | |

OTHER PUBLICATIONS

Llaneras et al., Design and Eval of a Prototype Rear Obstacle Detection and Driver Warning System (Year: 2005).*

(Continued)

*Primary Examiner* — Quang Pham
(74) *Attorney, Agent, or Firm* — Frank Lollo; Eversheds Sutherland (US) LLP

(57) ABSTRACT

Proximity-based vehicle security systems and methods are provided herein. An example method includes determining a napping event of a vehicle occupant within a vehicle, determining, based on signals of external sensors of the vehicle, when an object has entered one of a plurality of distance-based zones during the napping event, each of the distance-based zones being associated with a unique security response, and invoking the unique security response of the one of a plurality of distance-based zones.

20 Claims, 4 Drawing Sheets

(51) Int. Cl.
  *B60R 11/02* (2006.01)
  *B60R 25/33* (2013.01)
  *B60R 25/01* (2013.01)
  *B60R 25/102* (2013.01)
  *B60R 11/00* (2006.01)

(56) References Cited

U.S. PATENT DOCUMENTS

| | | | | |
|---|---|---|---|---|
| 5,475,494 A * | 12/1995 | Nishida | G06V 20/58 | 340/436 |
| 5,619,193 A * | 4/1997 | Doherty | B60R 16/0237 | 340/580 |
| 6,601,669 B1 * | 8/2003 | Agnew | B60W 30/09 | 180/170 |
| 6,650,402 B2 * | 11/2003 | Sullivan | G01S 17/95 | 356/5.01 |
| 7,132,976 B2 * | 11/2006 | Shinoda | G01S 13/931 | 342/75 |
| 7,248,342 B1 * | 7/2007 | Degnan | G01C 3/08 | 701/4 |
| 7,697,126 B2 * | 4/2010 | Farsaie | G01S 17/86 | 356/141.5 |
| 8,080,808 B2 * | 12/2011 | Norris | G01V 5/0008 | 250/390.04 |
| 8,825,391 B1 * | 9/2014 | Urmson | G01C 21/32 | 701/448 |
| 8,909,375 B2 * | 12/2014 | Larson | G01S 17/42 | 700/259 |
| 9,043,072 B1 * | 5/2015 | Tisdale | G05D 1/027 | 701/28 |
| 9,845,046 B1 * | 12/2017 | Arceo | B60Q 1/525 | |
| 9,855,890 B2 * | 1/2018 | James | B60K 37/06 | |
| 10,011,230 B1 * | 7/2018 | Brown | G06V 10/147 | |
| 10,131,323 B1 * | 11/2018 | Sterling | B60R 25/01 | |
| 10,175,361 B2 * | 1/2019 | Haines | G01S 17/95 | |
| 10,202,115 B2 * | 2/2019 | Stenneth | B60W 40/04 | |
| 10,235,859 B1 * | 3/2019 | Hiles | G08B 21/06 | |
| 10,455,187 B2 * | 10/2019 | Callis, Jr | B64C 39/024 | |
| 10,502,574 B2 * | 12/2019 | Robinson | G01C 21/18 | |
| 10,775,488 B2 * | 9/2020 | Bradley | G01S 7/4815 | |
| 10,782,405 B2 * | 9/2020 | Kim | B60W 50/14 | |
| 10,908,264 B2 * | 2/2021 | O'Keeffe | G01S 7/489 | |
| 2003/0061187 A1 * | 3/2003 | Fukui | G09B 5/00 | 706/45 |
| 2004/0199785 A1 * | 10/2004 | Pederson | H04N 7/181 | 340/293 |
| 2006/0098843 A1 * | 5/2006 | Chew | B61L 23/041 | 382/104 |
| 2006/0197867 A1 * | 9/2006 | Johnson | F16M 11/2014 | 348/E5.025 |
| 2007/0219720 A1 * | 9/2007 | Trepagnier | G05D 1/0278 | 701/300 |
| 2008/0205198 A1 * | 8/2008 | Sherman | G04B 45/0092 | 368/62 |
| 2008/0218381 A1 * | 9/2008 | Buckley | B60Q 1/50 | 340/932.2 |
| 2008/0228400 A1 * | 9/2008 | Wheeler | G08G 1/02 | 701/301 |
| 2009/0096634 A1 * | 4/2009 | Emam | G08G 1/167 | 340/901 |
| 2009/0211605 A1 * | 8/2009 | Ahmad | B60S 1/528 | 134/123 |
| 2010/0063736 A1 * | 3/2010 | Hoetzer | B60W 30/09 | 701/301 |
| 2010/0289631 A1 * | 11/2010 | Rao | B60T 7/22 | 348/148 |
| 2012/0056734 A1 * | 3/2012 | Ikeda | G08G 1/165 | 340/425.5 |
| 2013/0093583 A1 * | 4/2013 | Shapiro | B60Q 9/005 | 348/148 |
| 2013/0128048 A1 * | 5/2013 | Okajima | B60R 11/04 | 348/148 |
| 2013/0141572 A1 * | 6/2013 | Torres | H04N 7/185 | 348/143 |
| 2013/0265151 A1 * | 10/2013 | Braeuchle | G08B 13/19647 | 340/435 |
| 2013/0343071 A1 * | 12/2013 | Nagaoka | B60Q 1/085 | 362/466 |
| 2013/0343613 A1 * | 12/2013 | Heger | G01B 11/026 | 382/106 |
| 2014/0061305 A1 * | 3/2014 | Nahill | G06K 7/0095 | 235/438 |
| 2014/0270383 A1 * | 9/2014 | Pederson | G08G 1/207 | 382/104 |
| 2014/0305732 A1 * | 10/2014 | Tulett | G01V 1/135 | 181/112 |
| 2014/0347440 A1 * | 11/2014 | Hatcher | H04N 5/2252 | 348/36 |
| 2015/0239437 A1 * | 8/2015 | Ignaczak | B60T 8/171 | 701/70 |
| 2015/0251661 A1 | 9/2015 | Mathissen et al. | | |
| 2015/0353009 A1 * | 12/2015 | Lettieri | B60Q 9/006 | 340/435 |
| 2016/0282468 A1 * | 9/2016 | Gruver | G01S 17/87 | |
| 2017/0101032 A1 * | 4/2017 | Sugioka | B60Q 3/80 | |
| 2017/0106857 A1 * | 4/2017 | Nasser | B60W 30/09 | |
| 2017/0236016 A1 * | 8/2017 | Mori | G08B 21/06 | 382/104 |
| 2018/0079408 A1 * | 3/2018 | Takahashi | G06V 20/58 | |
| 2018/0090007 A1 * | 3/2018 | Takemori | G08G 1/166 | |
| 2018/0114442 A1 * | 4/2018 | Minemura | B60Q 9/008 | |
| 2018/0326981 A1 * | 11/2018 | Nakamura | B60W 10/04 | |
| 2020/0154097 A1 * | 5/2020 | Hisatsugu | B60K 37/04 | |
| 2020/0156533 A1 * | 5/2020 | Lee | G05D 1/0246 | |

OTHER PUBLICATIONS

Rezaei et al., Computer Vision for Driver Assistance Simultaneous Traffic and Driver Monitoring (Year: 2017).*
Bila et al., Vehicles of the Future A Survey of Research on Safety Issues (Year: 2017).*
Kathepuri et al., Embedded system for automotive (Year: 2016).*
Khan et al., A Comprehensive Survey of Driving Monitoring and Assistance Systems (Year: 2019).*
"Carawarn alarm system Secure-Sleep-1," Web page <https://www.carawarn.com/carawarn-alarm-system-secure-sleep-1#:-text=The Secure-Sleep alarm system, in the best possible way.html>, 7 pages, retrieved from the internet an Dec. 28, 2020.
Chris Davies (https://slashgear.com/author/chris/)—Dec. 29, 2017, "Ford wants to patent self-defense for autonomous cards" (8 pages).

* cited by examiner

PROXIMITY-BASED VEHICLE SECURITY SYSTEMS AND METHODS

FIELD

The present disclosure is generally directed to proximity-based vehicle security systems and methods that allow a user to nap or sleep within the vehicle in a secure manner.

BACKGROUND

The use of vehicles has evolved from a basic means of transportation for persons to more ubiquitous usages. Vehicles often function as an office, a theater, a home, and the like. Human-centered concerns are now central to vehicle designs. When napping or relaxing in a vehicle, a vehicle occupant may experience anxiety or fear due to concerns over security. The vehicle occupant may be concerned about criminals or other dangerous activity or malicious actors.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed to proximity-based vehicle security systems and methods that allow a user to nap or rest within the vehicle in a secure and relaxed manner. While a vehicle occupant may feel relaxed in their seat, the vehicle occupant might also feel unsafe sleeping due to concern over approaching people, animals, and so forth. Such fear might prevent the peace-of-mind required for a person in need of rest. The present disclosure involves vehicular self-watching systems that protect a napping vehicle occupant from exterior abnormalities and without disturbing the vehicle occupant unless the threat is imminent. These systems and methods can prevent/reduce a vehicle occupant's concern by offering a higher level of safety and advanced warning to the vehicle occupant.

Some example methods can be divided into three stages such as detection of a napping event/request, monitoring a plurality of distance-based zones around the vehicle while the user is sleeping (which can include various alerting responses to the approaching individual or the vehicle occupant), and finalizing a post-napping procedure. During monitoring, the systems and methods may be configured to detect objects or individuals in any of a plurality of distance-based zones and warn these objects or individuals to stay away from the vehicle. In some instances, the user of the vehicle may be monitored when the objects or individuals continue to advance towards the vehicle or are too close to the vehicle. Detection of objects or individuals can occur through the use of external vehicle sensors. Some responses can include activating the vehicle alarm system, contacting emergency responders, or other individuals. The plurality of distance-based zones can be defined by any combination of day and time, vehicle location, and an environmental condition, or combinations and permutations thereof. Each of the plurality of distance-based zones can include a unique security response that can warn the approaching object or individual and some may alert/warn the vehicle occupant.

Illustrative Embodiments

Figure 1:
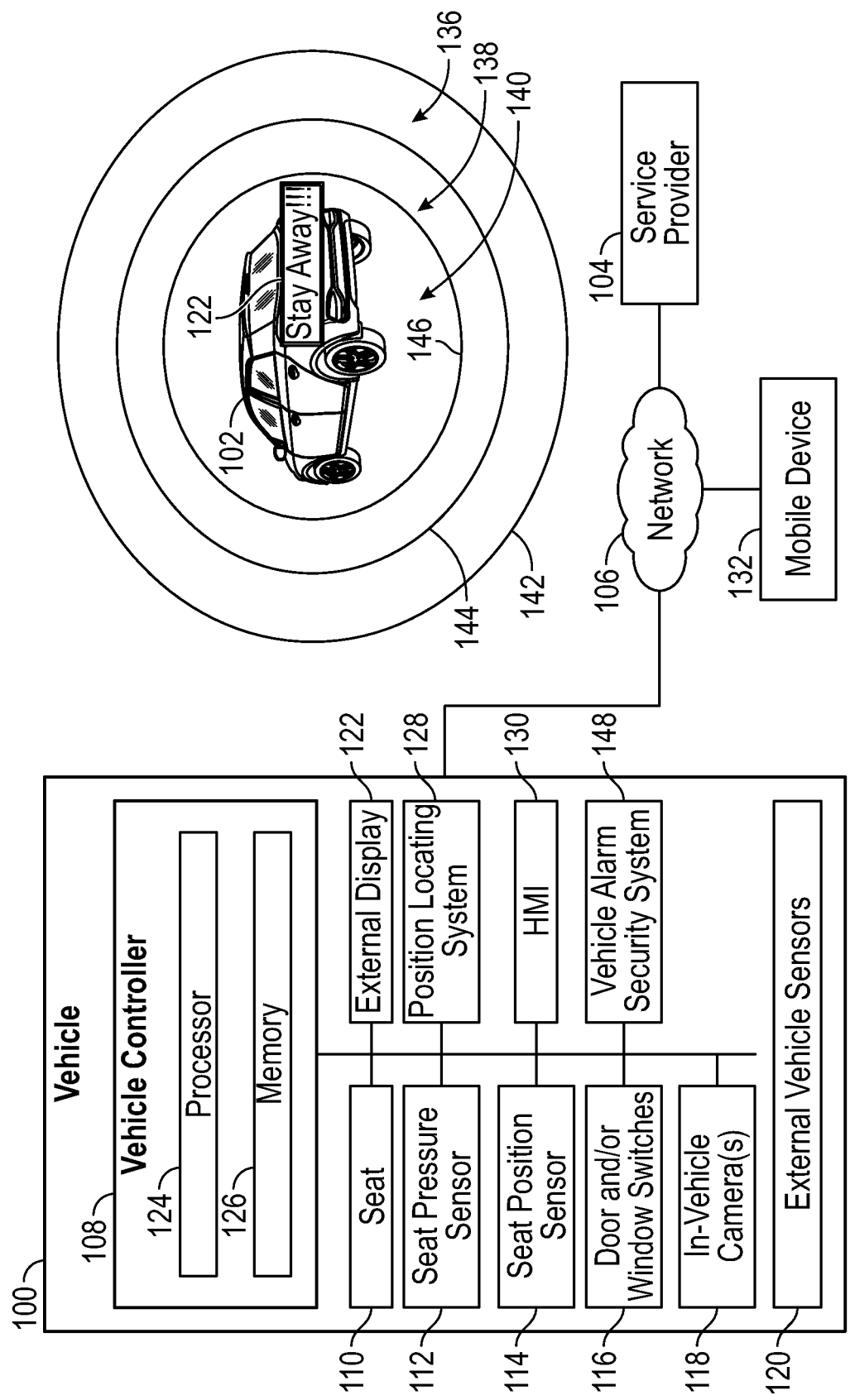
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. A vehicle 102 and a service provider 104 can be communicatively coupled through a network 106. The network 106 can include any public or private network such as Wi-Fi, cellular, or other long-range and/or short-range wireless network(s) or protocols. Each component of the architecture can be configured to access the network 106 using any means that would be known to one of ordinary skill in the art.

A vehicle 102 can be parked in an example location such as a parking lot. While a parking lot has been described as an example location, the vehicle 102 can be parked in any location as desired by a vehicle occupant. In general, the vehicle 102 can comprise a vehicle controller 108, a seat 110, a seat pressure sensor 112, a seat position sensor 114, door and/or window switches 116, and an in-vehicle camera 118. The vehicle 102 can also comprise various external sensors 120, which can be positioned around a periphery of the vehicle 102. The various external sensors 120 can include but are not limited to, one or more cameras, one or more microphones, radar, LIDAR (light detecting and ranging), as examples. The vehicle 102 can also comprise an external display 122 positioned anywhere on an exterior of the vehicle. The external display 122 could also be located inside a window or windshield of the vehicle 102.

The vehicle controller 108 can comprise a processor 124 and memory 126. The memory 126 stores instructions that can be executed by the processor 124 to perform aspects of proximity-based vehicle security detection and response. When referring to operations executed by the vehicle controller 108, it will be understood that this includes the execution of instructions by the processor 124.

In general, the vehicle controller 108 can be configured to determine a location of the vehicle 102. The location can be determined from data obtained from a position locating system 128 of the vehicle (e.g., global positioning system) or from another component such as a telematics control unit. In addition to location, the vehicle controller 108 can be configured to determine local weather conditions from, for example, a third-party weather service. The indication of poor weather may correlate to poor visibility.

The vehicle controller 108 can be configured to determine when the vehicle occupant is in or is about to be in a napping state. The vehicle controller 108 can determine the napping event or state from various inputs collected from within the vehicle cabin. For example, the vehicle controller 108 can determine that a vehicle occupant has changed a seat configuration of the seat 110. In more detail, the vehicle controller 108 may determine that the vehicle occupant is present in the seat 110 through signals from the seat pressure sensor 112. The vehicle controller 108 may then determine a current seat position/configuration from a seat position sensor 114. That is, the seat position sensor 114 can generate signals that indicate a state of recline for the seat 110. In one configuration, the seat 110 is upright, and in another, the seat can be laid flat. The seat 110 can also be positioned anywhere in between these two configurations as well, which may indicate that the vehicle occupant desires to nap or rest.

A napping state or event can also be determined by the vehicle controller 108 from images obtained of the vehicle occupant or the position of the vehicle occupant in the seat 110. For example, facial recognition can be used to identify when the vehicle occupant is awake or asleep (e.g., eyes open or closed). Other biometric information could be used, such as heartrate. Images can be processed to determine if the vehicle occupant is lying down or reclining, as opposed to sitting upright in the seat 110.

A napping state or event can also be determined by the vehicle controller 108 from a command or selection made by the user through a human-machine interface (HMI) 130 of the vehicle 102. For example, the HMI 130 could display a napping mode selection on a graphical user interface. This mode can be selected by the vehicle occupant. Alternatively, a physical button could be included in the vehicle 102 that allows the napping mode to be triggered on/off. In yet another example, the napping mode could be triggered from a menu provided on a mobile device 132 that is communicatively coupled with the vehicle controller 108 (for example, over a short-range wireless connection).

The vehicle controller 108 can also be configured to infer or recognize a napping state or event based on a pattern of vehicle occupant behavior. That is, the vehicle controller 108 can track vehicle occupant behaviors over time and determine what vehicle occupant behaviors are indicative of a napping state or event. For example, vehicle occupant behaviors could include words or phrases spoken by a vehicle occupant determined from voice recognition. The vehicle occupant behaviors could include the detection of other sounds such as snoring. The vehicle occupant behaviors could indicate a napping pattern, which can indicate locations where the vehicle occupant frequently takes naps in the vehicle, as well as other similar or related vehicle occupant behaviors. In yet another example, the vehicle occupant behaviors could include the vehicle occupant turning on certain music or other similar media.

The vehicle controller 108 can be configured to determine if the vehicle 102 is in a closed cabin state. For example, the vehicle controller 108 can receive signals from the actuators of the windows of the vehicle 102 or signals received from the door switches 116. The vehicle controller 108 can determine when the windows are closed, and the doors may be closed and locked from these signals.

Regardless of the method used to identify or confirm that a napping event is imminent or is occurring, the vehicle controller 108 can be configured to monitor areas around the vehicle for objects/individuals or other suspicious activity. Generally, after the napping state is confirmed as being active, the vehicle controller 108 can activate various ones of the external sensors 120 to provide surveillance protection to the user via an advanced warning of external activity near the vehicle 102.

The vehicle controller 108 can implement a security scheme. The security scheme can include parameters of a plurality of distance-based zones. In some instances, the plurality of distance-based zones are arranged in a concentric set with the vehicle 102 in a central position. For example, the plurality of distance-based zones can include a first zone 136, a second zone 138, and a third zone 140. It will be understood that the plurality of distance-based zones can comprise additional or fewer zones than those disclosed. Also, the shape and/size of the plurality of distance-based zones can be configured and are illustrated as circles for purposes description only.

Each of the distance-based zones can be configured uniquely. That is, each distance-based zone may be configurable with regard to any of day and time, vehicle location, and an environmental condition. Further, each of the distance-based zones can have a unique security response associated therewith. In one example, the distance-based zones can be configured in a concentric arrangement. The first zone 136 can extend from a first and outermost boundary 142 to an adjacent, second boundary 144. The second zone 138 may extend from the adjacent, second boundary 144 to an adjacent, third boundary 146. The third zone 140 can extend from the adjacent, third boundary 146 to the vehicle 102. The spacing between boundaries can be user-configurable or based on any of day and time, vehicle location, and an environmental condition. For example, if the vehicle 102 is in an urban location, the spacing between boundaries of zones can be smaller relative to the spacing between boundaries of zones when the vehicle 102 is in a sparsely inhabited location. In another example, if the vehicle 102 is parked in a location overnight, the spacing between boundaries of zones may be smaller than when the vehicle 102 is parked during the daytime. Spacing between boundaries of zones could be adjusted based on the detection of poor weather conditions.

In addition to adjusting the size or shape of zone boundaries, the vehicle controller 108 may also select attributes of what activities could trigger a security response in any given distance-based zone. For example, in the first zone 136, triggering criteria could include object/individual presence, detection of noise, and/or detection of vibration, or any combinations thereof. A distance-based zone may be associated with a security response, with the understanding that any indication of the presence of an object or individual can trigger the security response.

As noted above, the security response for each individual distance-based zone may be unique and result in one or more measures. Broadly, the vehicle controller 108 can activate one or more of the external sensors 120 of the vehicle 102 to monitor the distance-based zones.

The vehicle controller 108 can be configured to control a number of activated sensors to minimize power consumption without degrading monitoring performance. The external sensors 120 can be categorized into multiple levels, which include but are not limited to low power sensors (capacitive sensors, for example). These low power sensors may remain active during the napping period. When the lower power external sensors sense noise or vibration, the low power sensors can transmit a signal that is indicative of a threat signal source (e.g., person/object in one of the distance-based zone. The low power signals may operate to monitor the first zone 136.

The vehicle controller 108 can determine the direction of the source of the noise/vibration and wake up a camera facing the direction of the sensor that was triggered. The camera belongs to a second portion of the external sensors 120. If the trigger source remains but at a safe distance, such as ten feet, for example, more image sensors may wake up and expand the monitored field around the vehicle 102. However, if the noise or vibration source moves towards the vehicle 102 and becomes closer such as moving into the second zone 138, then a second set of the external sensors 120 such as radars and LIDAR, microphones, and so forth may be activated by the vehicle controller.

If the noise or vibration source moves towards the vehicle 102 and becomes closer, the vehicle controller 108 can cause the external display 122 to light up with a message "stay away," for example. In each of these examples, the noise or vibration source can be warned without disturbing the vehicle occupant.

If the noise or vibration source moves towards the vehicle 102 and becomes closer, such as moving into the third zone 140, then an internal alert to the napping/sleeping vehicle occupant may be activated, such as, turn on a wake-up alarm, output a voice message, and flash an internal vehicle light, and/or combinations thereof.

If the source contacts or reaches the vehicle 102, surrounding images and sounds may be captured and recorded by other external sensors, such as vehicle-mounted external microphones and external cameras. A vehicle alarm security system 148 may be activated as well.

It will be understood that the vehicle occupant can bypass/override any of the above warning and alert stages, either by turning them off, or sending them to a higher level, such as, letting the vehicle controller 108 place an emergency call, transmit captured images and sounds to the service provider 104, an emergency center, or even a designated person.

The vehicle occupant can adjust parameters of a unique security response manually, or the vehicle controller 108 can automatically control their values based on napping time and vehicle location. For example, a distance boundary could be ten feet during the day, but fifteen feet during the night. In another use case, the vehicle controller 108 can automatically control parameters of a unique security response based on threat type and image. A distance boundary could include ten feet if the approaching person/object's face is clear, while fifteen feet if the face is masked or is otherwise undeterminable. Broadly, the unique security response can be tailored to any of a vehicle location, weather conditions, day and time, and combinations thereof.

The vehicle controller 108 can also assess the vehicle parking conditions, vehicle location (hidden, noisy, dark, risky based on history and cloud info, etc.), day and time (during business hours, early, late, etc.), weather conditions (hot, cold), expected length of napping/sleeping time, and so forth. Permutations of these factors may be analyzed to provide recommendations to vehicle occupants before sleeping. For example, if the vehicle is located in a risky location (such as high-crime or highly-populated area), then the vehicle controller 108 may recommend that the vehicle occupant move to an alternative location (if the vehicle is autonomous it might drive itself). In another use case, the vehicle could be moved to a shaded or cooled zone for less HVAC (heating ventilation and air conditioning) running time (to save power). Or, if the vehicle location is in/near the busy area, it can move a few feet away from pedestrians' traffic.

As another safety check, the vehicle controller 108 can evaluate the car/seat security level and make recommendations. For example, the vehicle controller 108 can indicate to the vehicle occupant that they should sleep with head upright and facing front of the vehicle, for faster response in case of emergency. This can be estimated from the vehicle location data, camera images, seat sensor signals, and vehicle suspension system, and broadcasted to the vehicle occupant via the vehicle audio system or the HMI 130. In general, the vehicle controller 108 can select a seat configuration for a seat of the vehicle based on a threat level for the location of the vehicle. The threat level for an area could be determined from third-party crime statistical data based on location. The threat level could also be a factor of location, time of day, and so forth, without specific regard to crime statistical data.

In some instances, the vehicle controller 108 can determine a mobile phone charge status, and warn the user if less than 50%, for example. The mobile device could be connected to the vehicle controller 108 over a short-range wireless connection or through a wired connection. In general, these features can allow the vehicle controller 108 to determine if it is safe for the vehicle occupant to nap based on a variety of factors. Stated otherwise, the vehicle controller 108 can determine the suitability of napping in the vehicle, considering the safety, power, and sleep quality factors for the nap period. The vehicle controller 108 can also improve conditions within the vehicle cabin for the vehicle occupant during napping. For example, the vehicle controller 108 can slightly roll down the windows of the vehicle for fresh air. The vehicle controller 108 can cycle the HVAC system on and/or off as needed.

The vehicle controller 108 can also determine a transition from a napping mode to an active or awake mode/status for the vehicle occupant. As noted above, features used to determine if a napping event is occurring or is about to occur can be used to determine if the vehicle occupant is done napping. For example, determining that the seat 110 has transitioned from a reclined position to an upright position may indicate that the napping event is complete.

In another example, the vehicle controller 108 can evaluate camera images to determine if the vehicle occupant's eyes are open. The vehicle controller 108 can determine if a seat position has changed, if windows or a door has been opened, and so forth. The vehicle controller 108 can also detect the sound of the pre-scheduled alarm. For example, a mobile device may emit an alarm that is sensed by a microphone in the vehicle 102.

The vehicle controller 108 can monitor vehicle occupant and vehicle settings of napping events over a period of time and use these data to train with sleeping data. The vehicle controller 108 can update library/thresholds, and improve vehicle functions for the next nap/sleep request. That is, vehicle occupant preferences can be determined, and these preferences can be used to select automatic vehicle feature adjustments for future napping events. For example, the vehicle controller 108 may determine that the vehicle occupant prefers a specific style of music at a set volume, along with the air conditioning set to a specific temperature. These predictive features allow the vehicle controller 108 to enable schedule-based napping. That is, the vehicle controller 108 can determine a napping state or the end of a napping state from a pre-determined schedule. For example, if the vehicle occupant is determined to nap at a specific day, time, and/or location, the vehicle controller 108 can automatically adjust vehicle features in anticipation of a napping event. For example, the vehicle controller 108 can play music or set an internal cabin temperature in anticipation of a napping event.

Figure 2:
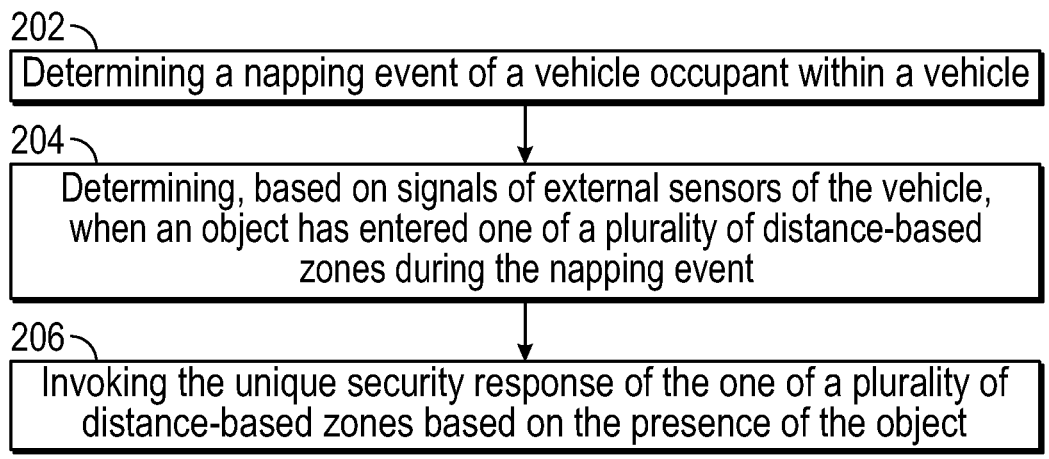
FIG. 2 is a flowchart of an example method related to proximity-based vehicle security.

FIG. 2 is a flowchart of an example method of the present disclosure. The method can include a step 202 of determining a napping event of a vehicle occupant within a vehicle. Methods for determining a napping event can include determining changes in seat position or occupancy, evaluation of images of the vehicle occupant, or other methods disclosed herein.

The method can also include a step 204 of determining, based on signals of external sensors of the vehicle, when an object has entered one of a plurality of distance-based zones during the napping event. As noted above, each of the distance-based zones can be associated with a unique security response.

The method can also include as step 206 of invoking the unique security response of the one of a plurality of distance-based zones based on the presence of the object. The security response could include activating additional external sensors, displaying messages on an external display, triggering an alarm system of the vehicle, or activating an emergency response such as placing a call to emergency response services or a designated contact list.

Figure 3:
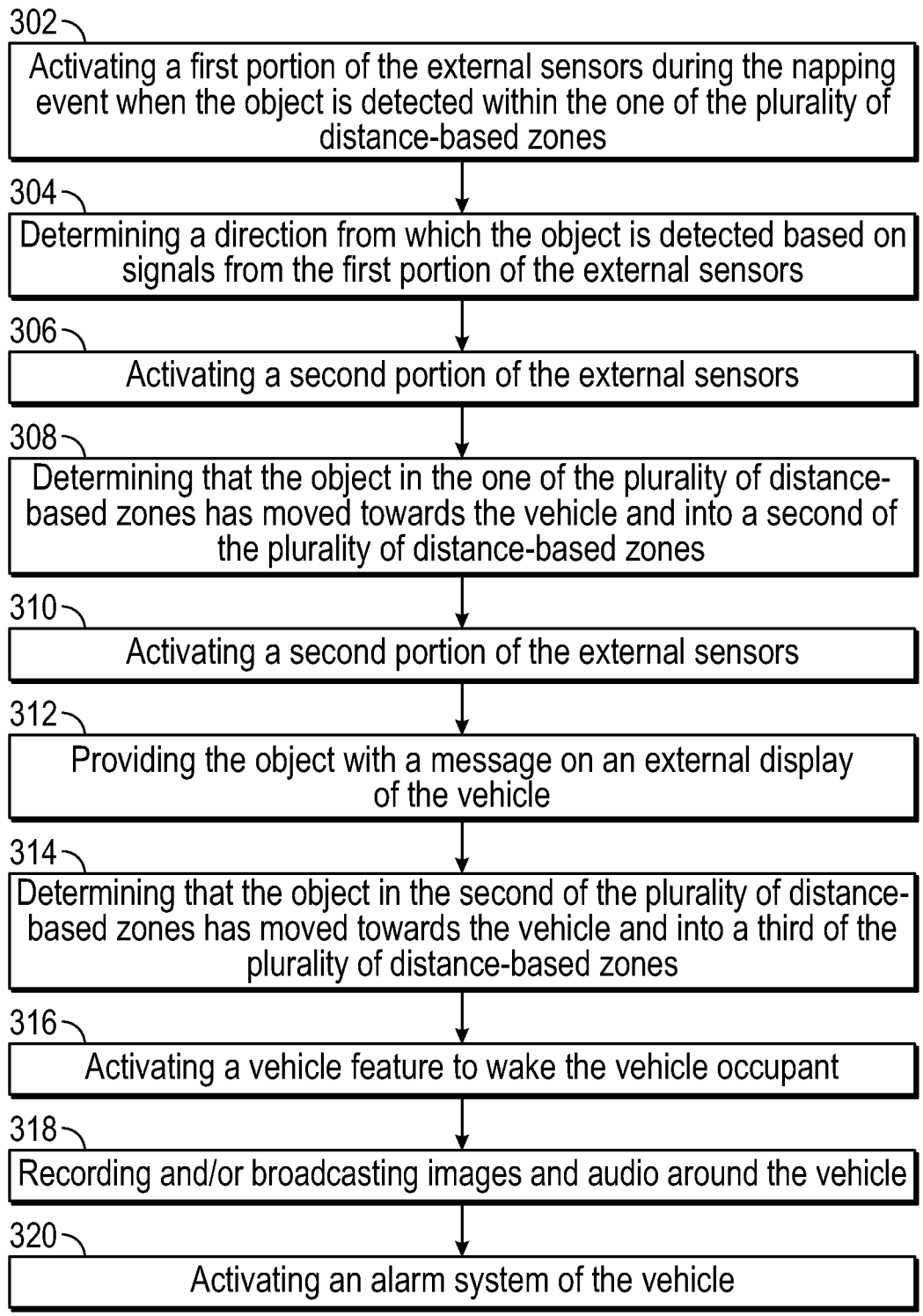
FIG. 3 is a flowchart of an example method for distance-based zone triggering and response.

FIG. 3 is a method of the present disclosure related to an example triggering and response scenario. The method can include a step 302 of activating a first portion of the external sensors during the napping event when the object is detected within the one of the plurality of distance-based zones. Next, the method can include a step 304 of determining a direction from which the object is detected based on signals from the first portion of the external sensors, as well as a step 306 of activating a second portion of the external sensors. To be sure, the second portion of the external sensors can be oriented in the direction from which the object was detected. For example, if the second portion of external sensors can be actuated or moved, the external sensors can be controlled to point in the direction of the noise/motion. In another example, if the external sensors are in a fixed position, the method can include activating external sensors on a side of the vehicle that correlated with the direction of the noise/motion.

The method can also include a step 308 of determining that the object in the one of the plurality of distance-based zones has moved towards the vehicle and into a second of the plurality of distance-based zones. The unique security response of the second of the plurality of distance-based zones can include a step 310 of activating a second portion of the external sensors, and a step 312 of providing the object with a message, for example, on an external display of the vehicle.

In various instances, the method can include a step 314 of determining that the object in the second of the plurality of distance-based zones has moved towards the vehicle and into a third of the plurality of distance-based zones. To be sure, the unique security response of the third of the plurality of distance-based zones includes a step 316 of activating a vehicle feature to wake the vehicle occupant, as well as a step 318 recording and/or broadcasting images and audio around the vehicle, and a step 320 of activating an alarm system of the vehicle.

Figure 4:
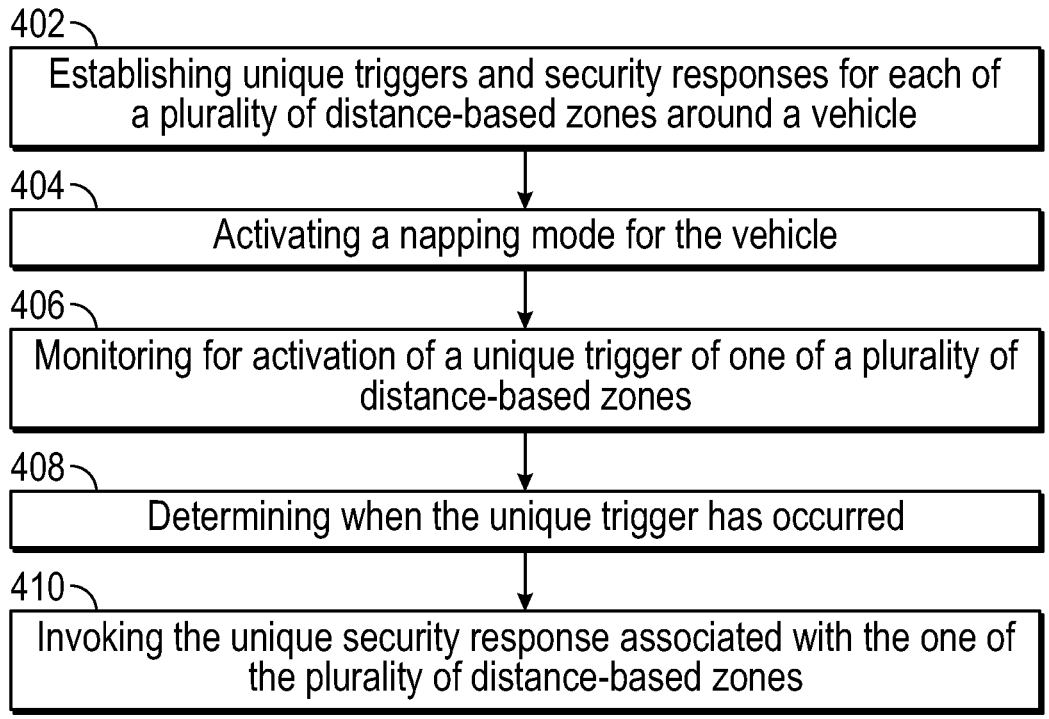
FIG. 4 is a flowchart of another example method related to proximity-based vehicle security.

FIG. 4 is a flowchart of another method of the present disclosure. The method can include a step 402 of establishing unique triggers and security responses for each of a plurality of distance-based zones around a vehicle. The trigger(s) could include noise, motion, or images that indicate the presence of an object/individual. The method can include a step 404 of activating a napping mode for the vehicle, as well as a step 406 of monitoring for activation of a unique trigger of one of a plurality of distance-based zones. The method can include a step 408 of determining when the unique trigger has occurred. As noted above, this can involve the assessment of signals from external vehicle sensors. The method can further include as step 410 of invoking the unique security response associated with the one of the plurality of distance-based zones.

Figure 5:
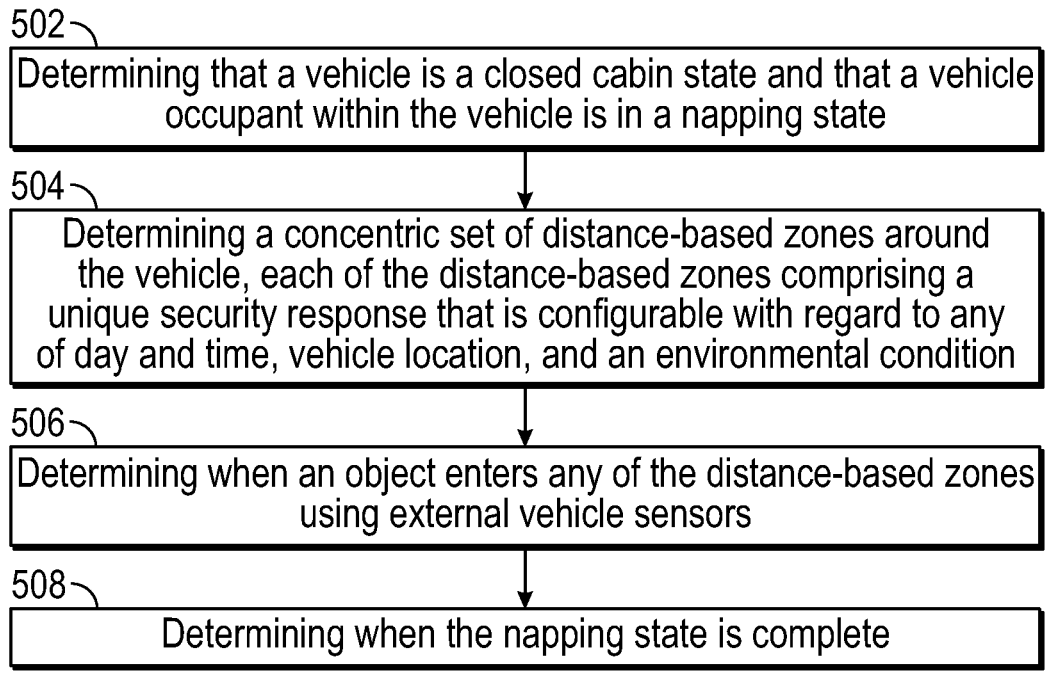
FIG. 5 is a flowchart of yet another example method of the present disclosure.

FIG. 5 is a flowchart of yet another method of the present disclosure. The method includes a step 502 of determining that a vehicle is a closed cabin state and that a vehicle occupant within the vehicle is in a napping state. As noted above, this can include determining that the windows of the vehicle are rolled up, as well as determining that the doors are both closed and locked. If not locked, the doors can be automatically locked by the vehicle controller.

The method can include a step 504 of determining a concentric set of distance-based zones around the vehicle, each of the distance-based zones comprising a unique security response that is configurable with regard to any of day and time, vehicle location, and an environmental condition. As noted above, this can include the unique security response comprising any of the selective activation of external vehicle sensors, activation of an alarm system of the vehicle, and display of a warning message on an external display of the vehicle. The method can include a step 506 of determining when an object enters any of the distance-based zones using external vehicle sensors, as well as a step 508 of determining when the napping state is complete.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein.

Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that stores computer-executable instructions are computer storage media (devices). Computer-readable media that carry computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid-state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A non-transitory computer-readable medium storing computer-executable instructions, that when executed by a processor, cause the processor to:
   determine that a vehicle occupant is in a napping event within a vehicle;
   determine concentric distance-based zones around the vehicle, each of the concentric distance-based zones comprising a unique security response;
   determine that an object enters a first distance-based zone using external vehicle sensors;
   determine that the object enters a second distance-based zone that is closer to the vehicle, wherein the unique security response of the second distance-based zone comprises:
   activate a vehicle feature to wake the vehicle occupant;
   record images and audio around the vehicle; and
   activate an alarm system of the vehicle.

2. The non-transitory computer-readable medium according to claim 1, wherein the napping event is determined from detecting that a seat within the vehicle is in a reclined position.

3. The non-transitory computer-readable medium according to claim 1, wherein the napping event is determined from any of a seat pressure sensor, and/or a seat position sensor.

4. The non-transitory computer-readable medium according to claim 1, further comprising determining that the vehicle is in a closed cabin state.

5. The non-transitory computer-readable medium according to claim 1, wherein the napping event is determined from a pre-determined schedule.

6. The non-transitory computer-readable medium according to claim 1, further comprising:
   activating a first portion of the external vehicle sensors during the napping event when the object is detected within the concentric distance-based zones;
   determining a direction from which the object is detected based on signals from the first portion of the external vehicle sensors; and
   activating a second portion of the external vehicle sensors, the second portion of the external vehicle sensors being oriented in the direction from which the object was detected.

7. The non-transitory computer-readable medium of claim 1, wherein the unique security response of the second distance-based zone comprises providing the object with a message.

8. The non-transitory computer-readable medium according to claim 7, further comprising:
   determining that the object in the concentric distance-based zones has moved towards the vehicle and into a third distance-based zone; and
   wherein the unique security response of the third distance-based zone comprises:
      activating a vehicle feature to wake the vehicle occupant;
      recording images and audio around the vehicle; and
      activating an alarm system of the vehicle.

9. The non-transitory computer-readable medium according to claim 8, further comprising any of transmitting images and audio to service provider, contacting an emergency response service, and/or designated contact.

10. The non-transitory computer-readable medium according to claim 1, wherein each of the concentric distance-based zones has a distance boundary that is configurable based on time of day or vehicle location.

11. A system, comprising:
    a processor; and
    a memory for storing instructions, the processor executing the instructions to:
    determine that vehicle occupant is in a napping state within a vehicle;
    determine concentric distance-based zones around the vehicle, each of the concentric distance-based zones comprising a unique security response;
    determine that an object enters a first distance-based zone using external vehicle sensors;
    determine that the object enters a second distance-based zone that is closer to the vehicle, wherein the unique security response of the second distance-based zone comprises:
       activate a vehicle feature to wake the vehicle occupant;
       record images and audio around the vehicle; and
       activate an alarm system of the vehicle.

12. The system according to claim 11, further comprising selecting a seat configuration for a seat of the vehicle based on a threat level for a location of the vehicle.

13. The system according to claim 11, wherein the unique security response is based on any of a vehicle location, weather conditions, day and time, and combinations thereof.

14. The system according to claim 11, further comprising an external display that displays warning messages based on an object being present in one of the concentric distance-based zones.

15. The system according to claim 11, wherein the processor is configured to at least partially roll down a window of the vehicle based on a threat level of the vehicle.

16. A method, comprising:
    determining that an occupant within a vehicle is in a napping state;
    determining concentric distance-based zones around the vehicle, each of the distance-based zones comprising a unique security response;
    determining that an object enters a first distance-based zone using external vehicle sensors; determining that the object enters a second distance-based zone that is closer to the vehicle, wherein the unique security response of the second distance-based zone comprises:
       activating a vehicle feature to wake the vehicle occupant;
       recording images and audio around the vehicle; and
       activating an alarm system of the vehicle.

17. The method according to claim 16, wherein the napping state is determined when a seat of the vehicle is occupied by the occupant and is in a reclined or laid-flat configuration.

18. The method according to claim 17, wherein determining when the napping state is complete includes determining when the seat has changed from reclined or laid-flat configuration to an upright configuration.

19. The method according to claim 16, wherein the napping state is determined when the occupant selects a napping mode from a human machine interface of the vehicle.

20. The method according to claim 16, wherein each of the distance-based zones has a distance boundary value.

* * * * *